(12) United States Patent
Becker et al.

(10) Patent No.: US 8,289,189 B2
(45) Date of Patent: Oct. 16, 2012

(54) CAMERA SYSTEM FOR USE IN VEHICLE PARKING

(75) Inventors: Jan Becker, Palo Alto, CA (US); Soeren Kammel, San Jose, CA (US); Benjamin Pitzer, San Jose, CA (US); Charles DuHadway, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 498 days.

(21) Appl. No.: 12/463,699

(22) Filed: May 11, 2009

(65) Prior Publication Data

US 2010/0283633 A1 Nov. 11, 2010

(51) Int. Cl.
*B60Q 1/48* (2006.01)
*H04N 7/18* (2006.01)

(52) U.S. Cl. ............... 340/932.2; 340/937; 348/143; 348/148

(58) Field of Classification Search .......... 340/435, 340/436, 932.2, 937, 933; 701/1, 36, 201, 701/216, 301; 348/143, 148, E7.085; 382/107, 382/154
See application file for complete search history.

(56) References Cited

U.S. PATENT DOCUMENTS

| | | | | |
|---|---|---|---|---|
| 6,476,731 B1* | 11/2002 | Miki et al. | ................ | 340/937 |
| 7,069,128 B2* | 6/2006 | Iwama | ............... | 701/36 |
| 7,366,595 B1* | 4/2008 | Shimizu et al. | ............ | 701/301 |
| 7,640,107 B2* | 12/2009 | Shimizu et al. | ............ | 701/216 |
| 7,640,108 B2* | 12/2009 | Shimizu et al. | ............ | 701/301 |
| 2008/0181488 A1* | 7/2008 | Ishii et al. | ............ | 382/154 |
| 2009/0187300 A1* | 7/2009 | Everitt et al. | ............ | 701/29 |
| 2009/0207045 A1* | 8/2009 | Jung | ............ | 340/932.2 |
| 2010/0049402 A1* | 2/2010 | Tanaka | ............ | 701/41 |
| 2010/0066825 A1* | 3/2010 | Kuboyama et al. | ...... | 348/118 |
| 2010/0194886 A1* | 8/2010 | Asari et al. | ............ | 348/148 |
| 2010/0246901 A1* | 9/2010 | Yang | ............ | 382/107 |

* cited by examiner

*Primary Examiner* — Van T. Trieu

(57) ABSTRACT

A method for assisting in parallel parking includes providing a vehicle with a forward-looking camera and/or a backward-looking camera. The camera is used to capture an image of a parking area including at least one unoccupied parking space and a plurality of parking spaces occupied by other vehicles. A homography of the captured image is created. The homography is used to estimate an image of the parking area from an overhead viewpoint. A portion of the overhead image including the unoccupied parking space is displayed on a display screen within a passenger compartment of the vehicle.

21 Claims, 12 Drawing Sheets

CAMERA SYSTEM FOR USE IN VEHICLE PARKING

BACKGROUND OF THE INVENTION

1. Field of the Invention

The present invention relates to camera systems for use in vehicles, and, more particularly, to camera systems for use in parking of vehicles.

2. Description of the Related Art

Nissan has developed a driver assistance system called "Nissan Around View Monitor" which employs four ultra-wide high-resolution cameras mounted in the front, rear and both sides of the vehicle to provide a bird's eye view of the vehicle's surroundings. All those images are processed and displayed in real time on a dash-mounted screen, giving drivers a 360 degree view of obstacles surrounding the vehicle which they may want to avoid hitting. Shifting the car into reverse or drive alternates between a view of the front or rear. Drivers are able to toggle the left, front and right views when performing a particularly tricky parallel parking maneuver. The first application of Nissan's "Around View Monitor" in the United States is in the Infiniti EX35 model.

Mapping is a technique used by robots and vehicles to build up a map within an unknown environment. This is not as straightforward as it might sound due to inherent uncertainties in discerning the robot's relative movement from its various sensors. A system for mapping road surfaces may include high-end LIDAR, GPS and Inertial Measurement Unit (IMU) sensors. The system may produce a two-dimensional surface image of ground reflectivity with five centimeter resolution of the road surface.

Other known systems focus on generating bird's eye views of urban and rural terrains by use of cameras mounted on either aircraft or satellites. The most common approach is pushbroom mosaicing, which works well for applications wherein the desired viewpoint of the final mosaic is close to the original viewpoint.

Some commercial offerings, such as Google's "Street View" or Microsoft's "Street Side", create static maps of urban scenes. The focus in these systems is on providing views of the urban city similar to what an automobile passenger or pedestrian might see moving around the same city. The differences in perspective between the captured and final images are small if any and all processing can be done offline.

Other systems have been proposed that generate maps using sparse feature representations, sometimes referred to as landmarks. In particular, several attempts at vSLAM (visual simultaneous localization and mapping) have been developed and demonstrated, primarily in indoor environments that use camera systems to create feature based maps. In general, these feature-based maps are unusable by a human attempting to localize himself or his vehicle.

Forward-looking automotive cameras are used in various applications including night vision assistance, lane detection, lane departure warning, lane keeping, and road sign detection. In the future, such cameras will be standard in upper class vehicles. Backward-facing cameras are already used as a visual aid for backing up and may be required in the future for backover avoidance.

Various approaches to parking assistance exist. These approaches have in common that sonar is used as the main sensor. The advantage of sonar is that it is inexpensive. The disadvantage of sonar is that sonar measurements are noisy and inaccurate, which sometimes leads to false system behavior. Existing systems issue a visual and/or audible warning to the driver before a collision with an object. Future systems will assist the driver by operating the steering (i.e., semi-autonomous parking) or steering plus gas/brakes (i.e., fully autonomous parking).

BMW has presented a camera-based system for parking assistance using motion-stereo. This system requires additional sideward-facing cameras in order to detect the parking area.

What is neither disclosed nor suggested by the prior art is a method for utilizing a forward-facing camera and/or a backward-facing camera in providing a driver with an overhead view for assistance in parallel parking.

SUMMARY OF THE INVENTION

The present invention may provide a system including a forward and/or backward facing camera to assist a vehicle driver during parallel parking.

The invention comprises, in one form thereof, a method for assisting in parallel parking, including providing a vehicle with a forward-looking camera and/or a backward-looking camera. The camera is used to capture an image of a parking area including at least one unoccupied parking space and a plurality of parking spaces occupied by other vehicles. A homography of the captured image is created. The homography is used to estimate an image of the parking area from an overhead viewpoint. A portion of the overhead image including the unoccupied parking space is displayed on a display screen within a passenger compartment of the vehicle.

The invention comprises, in another form thereof, an electronic parking-assistance arrangement for a vehicle. The arrangement includes a forward-looking camera and/or a backward-looking camera provided in the vehicle. A processor is coupled to at least one camera. The processor receives first images of a parking area. The images are captured by the camera from a substantially horizontal viewpoint. The processor translates the first images into second images from a substantially vertical viewpoint. An unoccupied parking space within the second images is identified. A representation of the vehicle is superimposed onto the second images when the vehicle is substantially adjacent to the unoccupied parking space. A position of the vehicle representation relative to the unoccupied parking space in the second images is continuously updated to indicate an actual position of the vehicle relative to the unoccupied parking space. A display screen is provided in a passenger compartment of the vehicle and is coupled to the processor. The display screen receives and displays the second images with the superimposed representations of the vehicle.

The invention comprises, in yet another form thereof, a method of displaying map information, including providing a vehicle with a forward-looking camera and/or a backward-looking camera. The camera is used to capture images of a surrounding area. Homographies of the captured images are created. The homographies are used to estimate images of the area from an overhead viewpoint. Positions of the vehicle relative to the overhead images as the vehicle moves are determined. The overhead images are displayed on a display screen within a passenger compartment of the vehicle. The displayed overhead images include real time representations of the vehicle. Positions of the vehicle representations within the overhead images are substantially continuously updated based on the determining step.

An advantage of the present invention is that it requires fewer sensors than do known systems and is therefore significantly cheaper than known systems. Specifically, the present invention may utilize only a forward- and/or a backward-looking camera.

Another advantage of the present invention is that it utilizes equipment that will be standard equipment on future vehicles, and does not require additional hardware. More particularly, both forward-looking and backward-looking cameras will be standard equipment in future automobiles. The forward-looking camera is used for night vision, lane detection, road sign detection, etc. The backward-looking camera is typically used for backover avoidance and may be required in future cars. See, for example, the guidance provided by the National Highway Traffic Safety Administration regarding Backover Avoidance. Thus, the present invention may provide an additional value benefit through software and may use only existing hardware.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
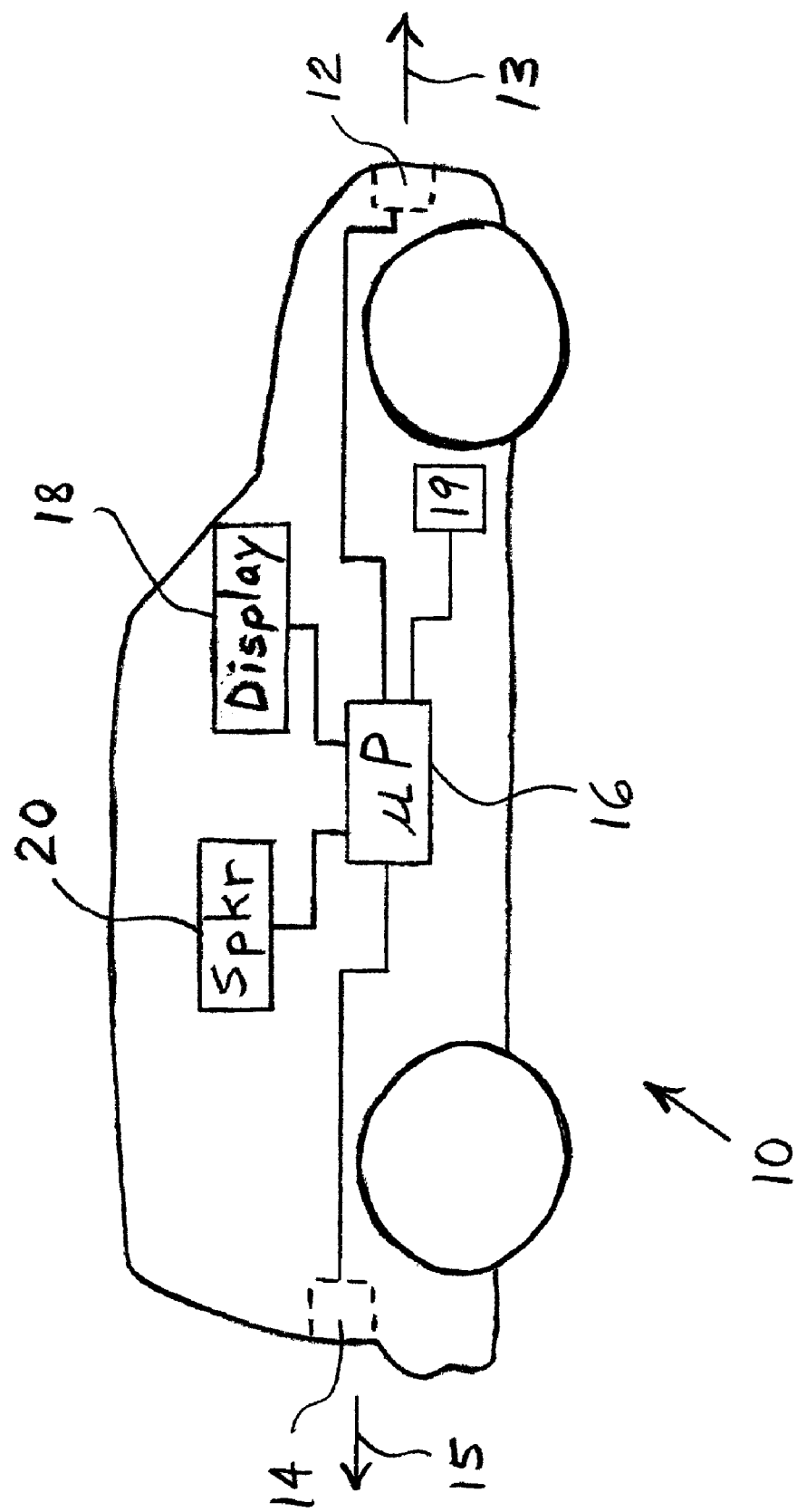
FIG. 1 is a schematic plan view of a vehicle including one embodiment of a parking-assistance arrangement of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Referring now to the drawings, and particularly to FIG. 1, there is shown one embodiment of a vehicle including a parking-assistance arrangement 10 of the present invention having a forward-looking camera 12, a backward-looking camera 14, a processor 16, a display 18, a steering sensor 19 and an audio speaker 20. Forward-looking camera 12 may be installed in the grille of the vehicle such that camera 12 faces, and is directed in, a forward direction 13. Backward-looking camera 14 may be installed in the rear bumper of the vehicle such that camera 14 faces, and is directed in, a backward direction 15. In some embodiments, the parking-assistance arrangement includes only one of forward-looking camera 12 and backward-looking camera 14, but not both.

Display 18 may include an electronic computer screen or monitor, for example. In one embodiment, the screen or monitor may be mounted on a dashboard of the vehicle, which may be an automobile.

Processor 16 may be in the form of and standard microprocessor, and may include a memory (not shown). Processor 16 may control the information or content that is displayed on the screen or monitor of display 18 and that is audibly output from speaker 20.

Figure 2:
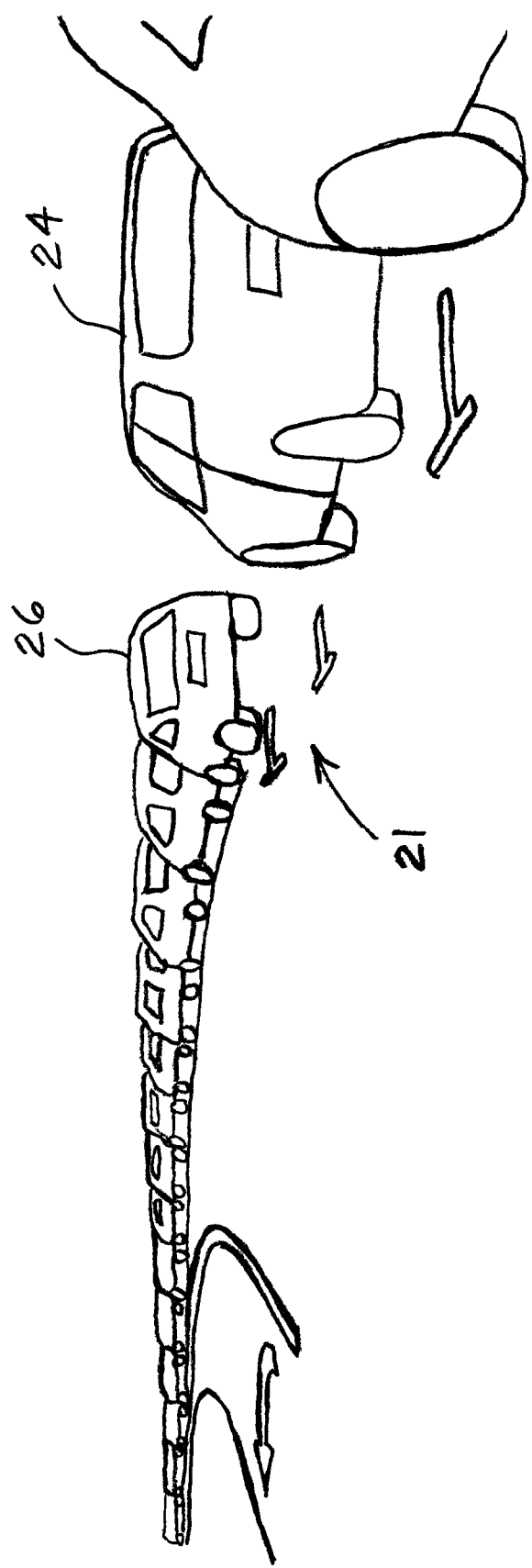
FIG. 2 is an example image that is captured by the forward-looking camera of the parking-assistance arrangement of FIG. 1.
Figure 3:
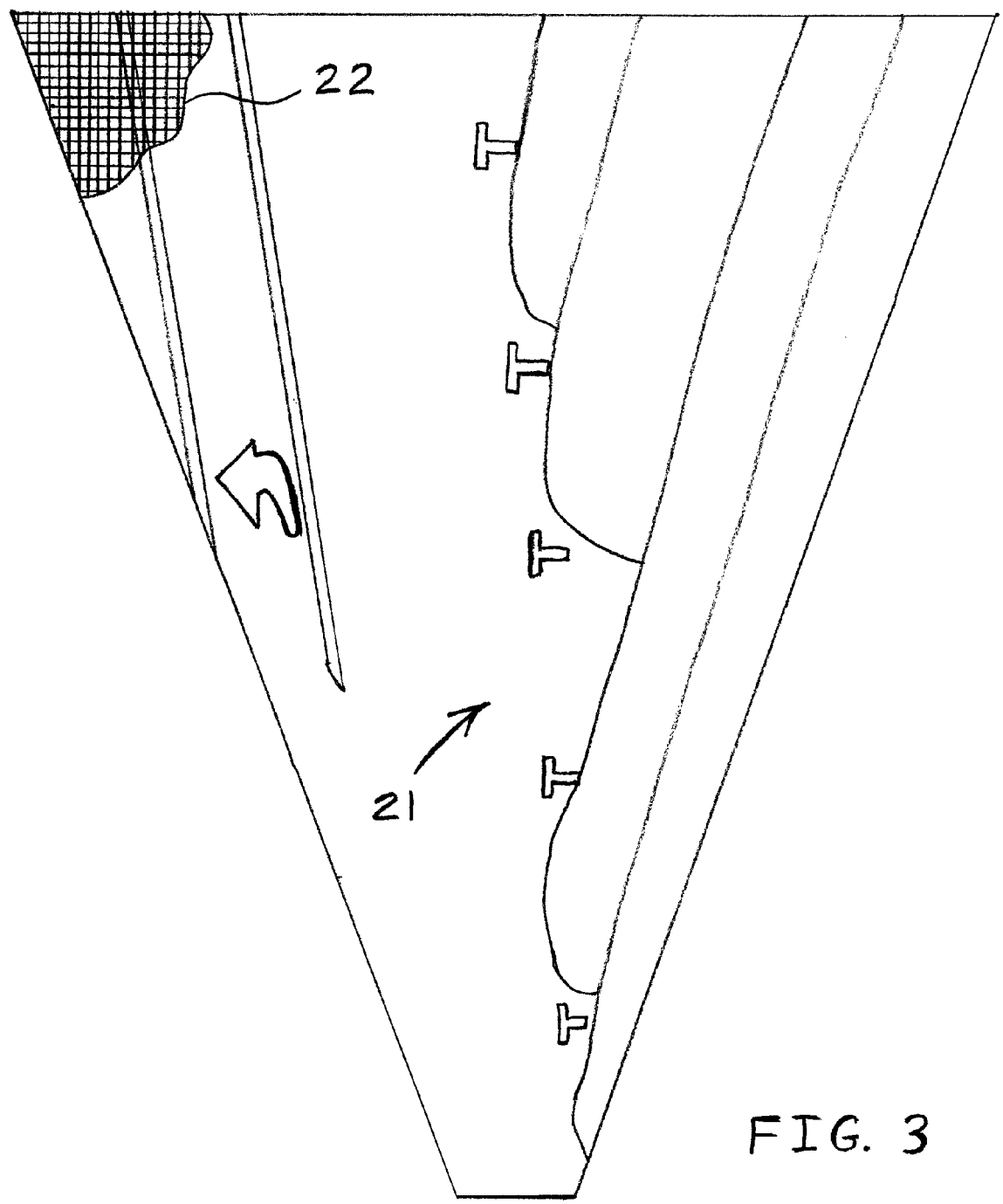
FIG. 3 is a projection of the image of FIG. 2 onto an estimated three-dimensional ground plane by use of homography, according to one embodiment of the present invention.

The present invention may utilize static mapping. Camera(s) 12 and 14 may constantly capture images of the environment as the vehicle moves. A typical image that is captured by forward-looking camera 12 and is displayed on display 18 while the driver is searching for a parking space is shown in FIG. 2. This image happens to include an unoccupied parking space 21. Given the relative position of camera 12 in the vehicle, a homography, or "projective transformation," may be computed between the image plane and the actual ground plane. The homography may be used to project each image, such as that shown in FIG. 2, onto an estimated three-dimensional ground plane, as shown in the projected camera image of FIG. 3.

In order to collect data across multiple frames at high resolution, a discrete grid, as fragmentarily indicated at 22, may be aligned with, and superimposed onto, the ground plane. In one particular embodiment, each grid cell measures five cm by five cm and collects all pixels whose centers are projected onto the cell within its boundaries. The grid itself may have a finite height and width, and may be constantly re-centered on the camera as the camera moves through the scene.

In one embodiment, stored in memory is an association between each cell and a linked list of the pixel values that have been recently observed at that cell location from all images. The pixel values that have been observed within a predetermined previous time period may be stored in memory, and the oldest pixel values may be replaced in memory with the most recently observed pixel values. Cells near the center of the image (and consequently the center of the grid) may collect a much higher number of observations than those cells to either side. In one embodiment, cells near the center of the image collect up to about 700 observations, while cells near the left-hand side perimeter or right-hand side perimeter collect only four or five observations.

The final value of each grid cell can then be computed in any of several different ways, and these cells may be combined to form a single bird's-eye view of the observed environment. The simplest aggregation technique is to select the most recently observed value in each cell. An example mapping resulting from this technique is illustrated in FIG. 4, which is a map generated from a single forward-facing camera.

In other embodiments, using the mean or mode of the observed values may reduce the distortions caused by obstacles that lie outside of (e.g., above) the ground plane, such as other vehicles. It is also possible to use the variance of values collected in a single cell to detect and possibly remove such distortions. FIG. 5 is a map similar to FIG. 4 with at least some of the distortions caused by vehicles 24 and 26 removed.

Figure 4:
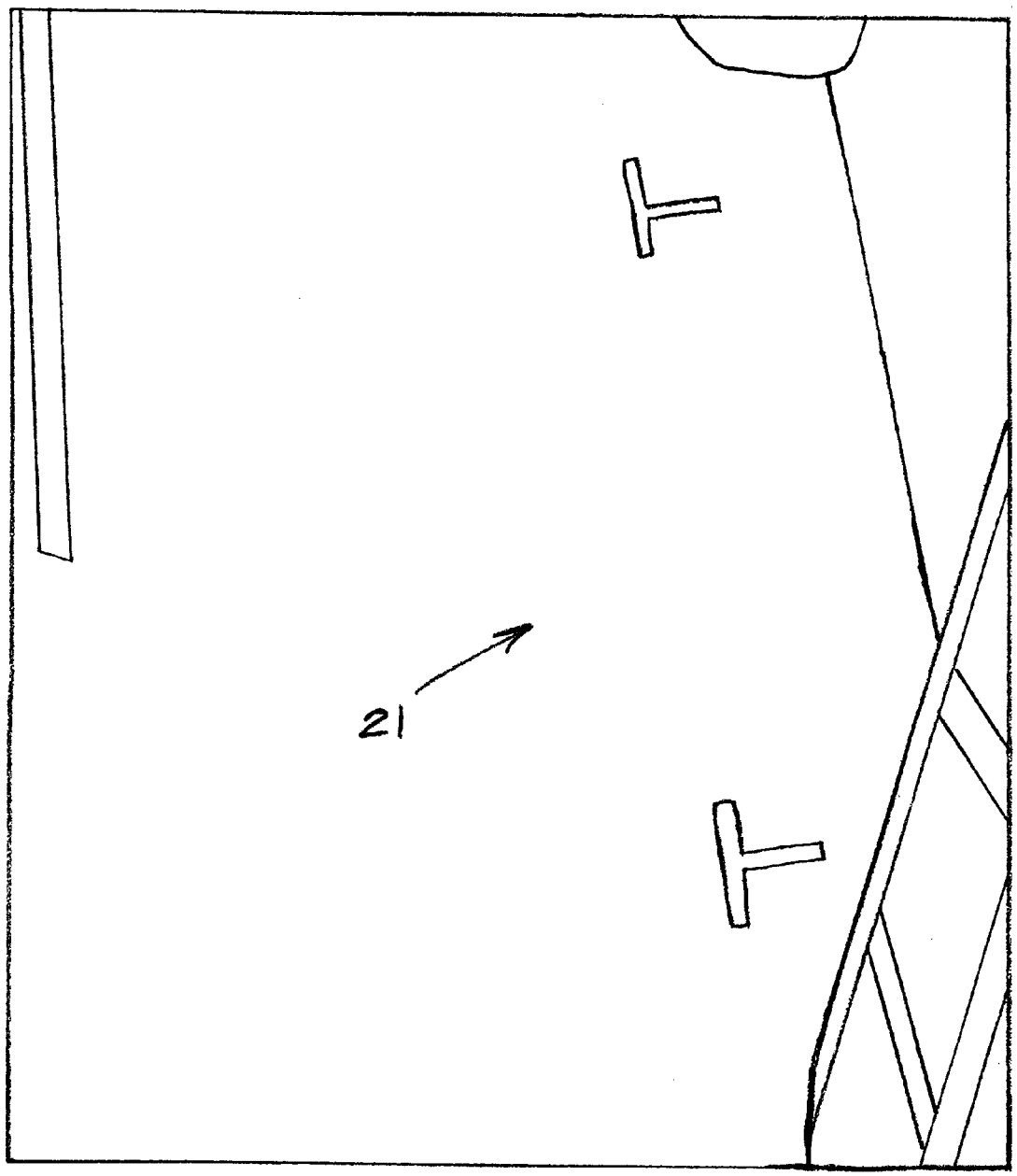
FIG. 4 is an example mapping resulting from one embodiment of a method of the present invention.
Figure 5:
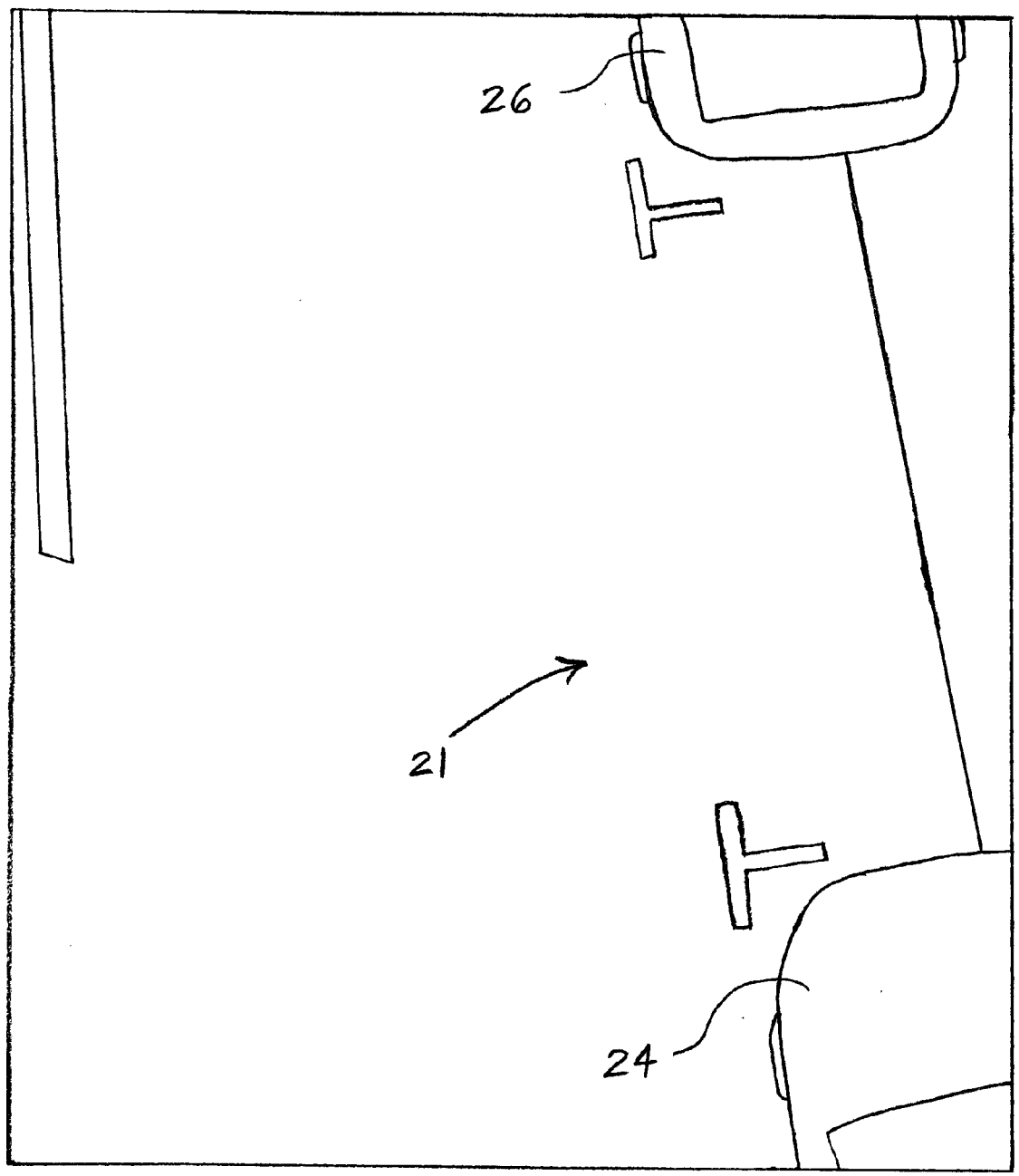
FIG. 5 is an example mapping resulting from another embodiment of a method of the present invention.
Figure 6:
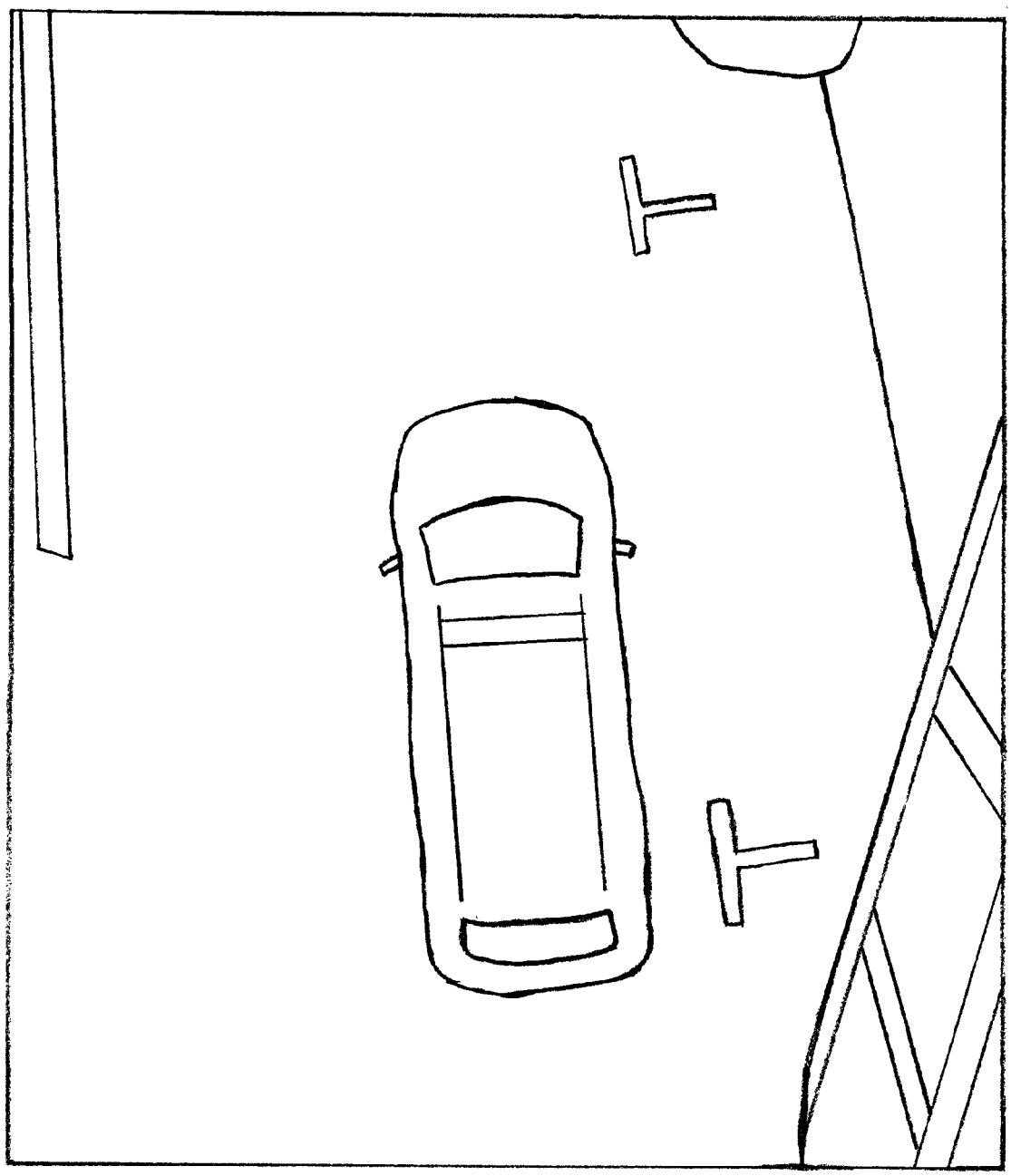
FIG. 6 is the mapping of FIG. 4 with an image of the vehicle of FIG. 1 superimposed thereon.

A map that may be used by the driver is illustrated in FIG. 6, which is the mapping of FIG. 4 with an image or representation of the vehicle in which arrangement 10 is installed being superimposed or overlaid thereon. However, it is also possible for the vehicle to be superimposed on the reduced-distortion version of FIG. 5. The superimposed vehicle representation may be drawn to scale and may be geometrically and positionally accurate so as to give the driver an accurate estimate of the vehicle's current position and size relative to any lane or parking markers on the road.

As described above, the present invention may be applied to parking assistance. While the driver is looking for a parking spot for parallel parking, the system may constantly and continuously map the vehicle environment. Using the mapping and the described object detection, it is possible to measure the size of a parking spot from the map. The measured size of the parking space may be compared to the size of the driver's vehicle, and an indication may be provided to the driver as to whether the parking space is large enough to accommodate the driver's vehicle.

The system may provide the driver with a visual and/or audible signal that a parking space has been found, and may further provide the driver with a visual and/or audible signal of the location and size of the parking space. The size of the parking space may be expressed relative to the size of the vehicle.

In one embodiment, the driver may provide a threshold dimension or dimensions that a parking space must measure before the system indicates to the driver that the parking spot is available. The threshold dimension(s) may be expressed as a distance by which the parking space is larger than the vehicle.

In another embodiment, the system may keep records of the dimensions of previous parking spaces in which the vehicle has been successfully parallel parked, as well as the dimensions of previous parking spaces in which an attempt was made to park the vehicle, but the attempt was unsuccessful. The system may then provide the driver with an indication of the success rate of previous parallel parking attempts in similarly sized spaces. Because some drivers may be better at parallel parking than other drivers, the system may additionally keep such records of previous parallel parking by individual driver. The system may further provide the individual driver with his personal previous success rate in parking in spaces approximately the same size as the currently-identified spot.

Figure 7:
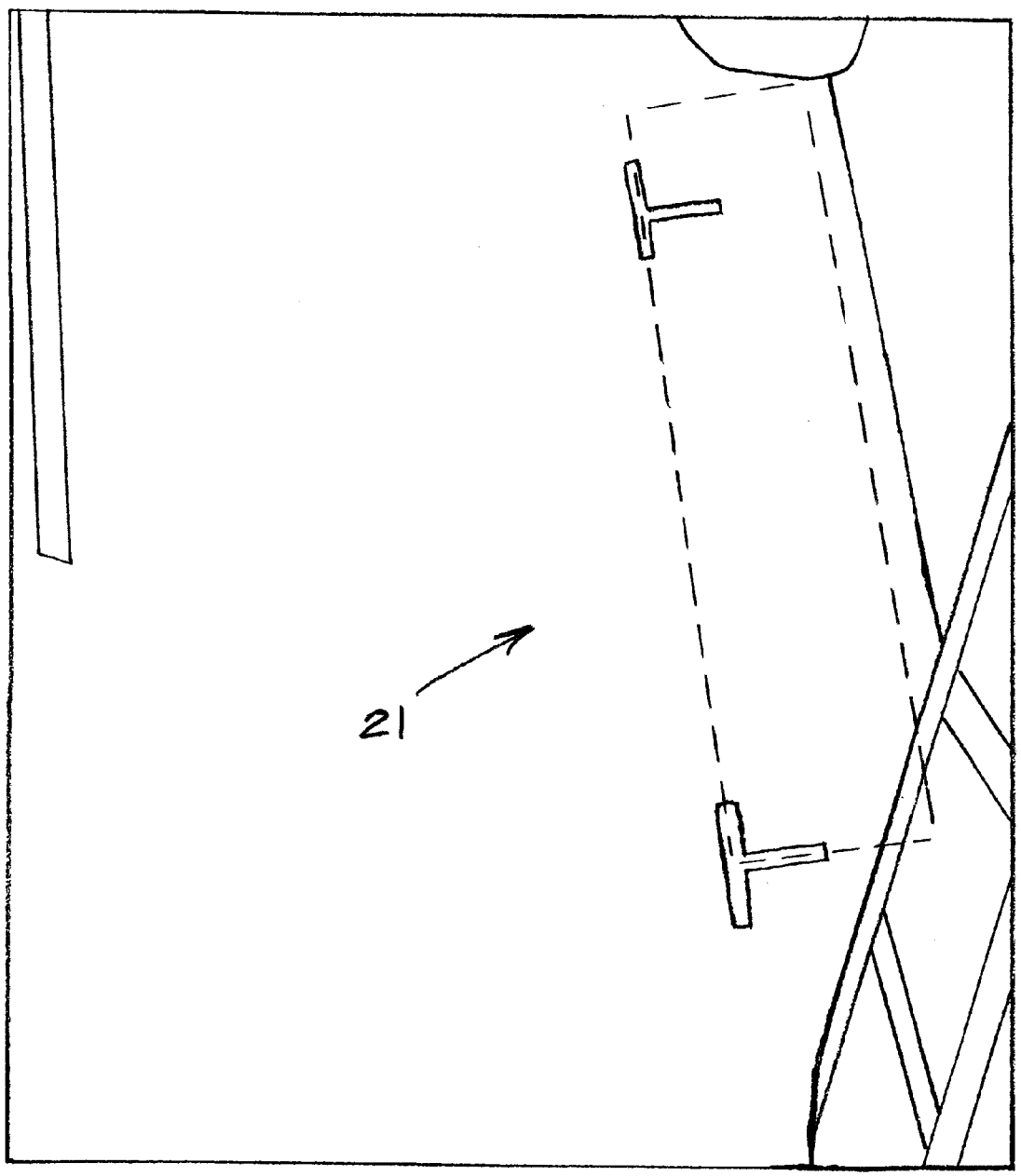
FIG. 7 is an example mapping resulting from yet another embodiment of a method of the present invention.

The parking spot and its size may be displayed on the map, as indicated by dashed lines in FIG. 7. In this particular embodiment, the parking spot and its dimensions are represented by a rectangle provided on display 18. The position of the vehicle relative to the parking spot may also be displayed on display 18.

The system may provide the driver with spoken and/or visual instructions regarding recommended parking techniques. For example, the system may instruct the driver how far up the street that he should drive up before putting the vehicle in Reverse gear. A suggestion for the optimal path for parallel parking may be provided visually on display 18. The optimal path may be the path by which the vehicle may drive into the parking space with maximum clearance between the vehicle and obstructions such as other parked vehicles.

Figure 8:
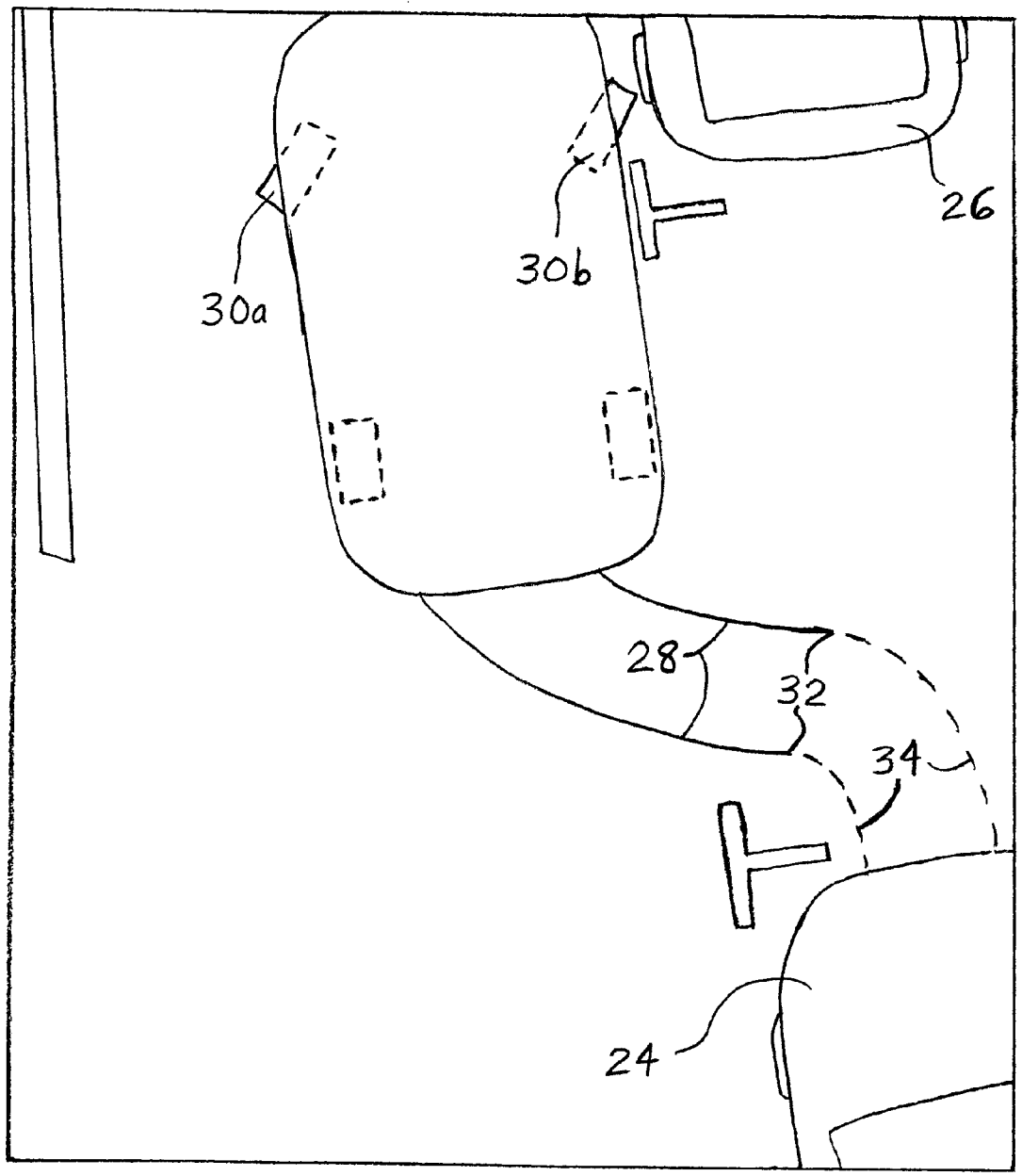
FIG. 8 is an example mapping resulting from still another embodiment of a method of the present invention.

In addition to the optimal path, display 18 may also illustrate the path that the vehicle would take according to the current position of the steering wheel and/or tire, as sensed by steering sensor 19. Display 18 may continually follow and display the movements of the vehicle, thereby giving the driver feedback. The system may also instruct the driver regarding when and how far to turn the steering wheel while driving in Reverse gear. For example, the example inventive screen display of FIG. 8 illustrates an expected path 28, indicated in solid lines, of the driver's vehicle based on the steering position of tires 30a-b as sensed by steering sensor 19. At point 32 along expected path 28, the driver will need to turn sharply to the left in order to follow an optimal path 34, indicated in dashed lines, which branches off from expected path 28.

Figure 9:
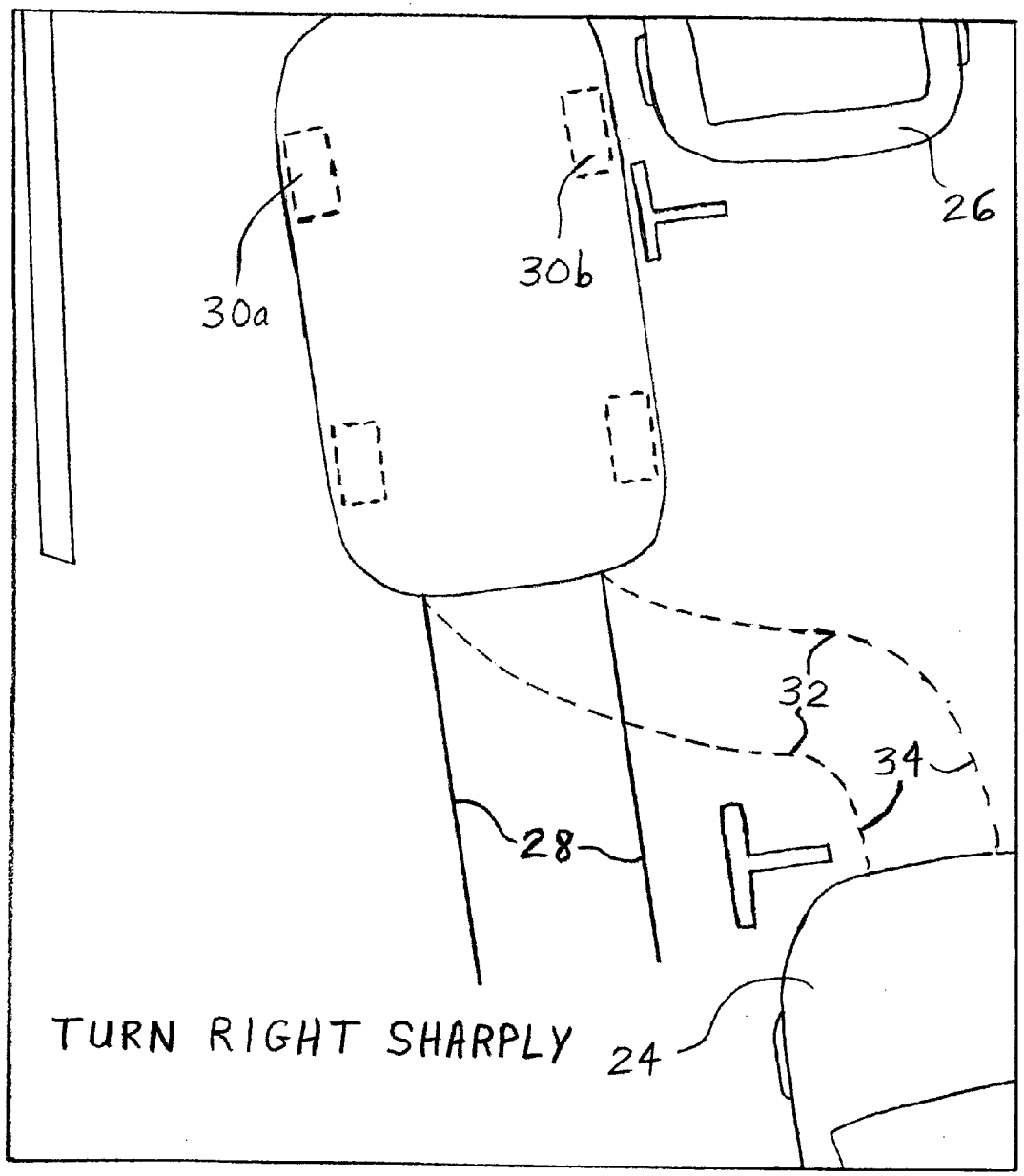
FIG. 9 is the example mapping of FIG. 8 with the tires of the driver's vehicle in the straightened position.

In FIG. 9, expected path 28 of the driver's vehicle may overlap and coincide with optimal path 34. However, in one embodiment, expected path 28 and optimal path may be illustrated in the display separately when the two paths do not overlap or coincide. As an example, the display screen of FIG. 9 illustrates a linear expected path 28 resulting from tires 30a-b being in their straightened position as compared to optimal path 34. Because of the divergence of expected path 28 from optimal path 34, text instructions to "TURN RIGHT SHARPLY" may be provided on the screen display as shown in FIG. 9. In addition, or alternatively, speaker 20 may emit audible spoken instructions to "turn right sharply." These instructions to turn right may cease when the driver turns the steering wheel to the right sharply enough to cause expected path 28 to coincide with optimal path 34, as illustrated in FIG. 8.

Figure 10:
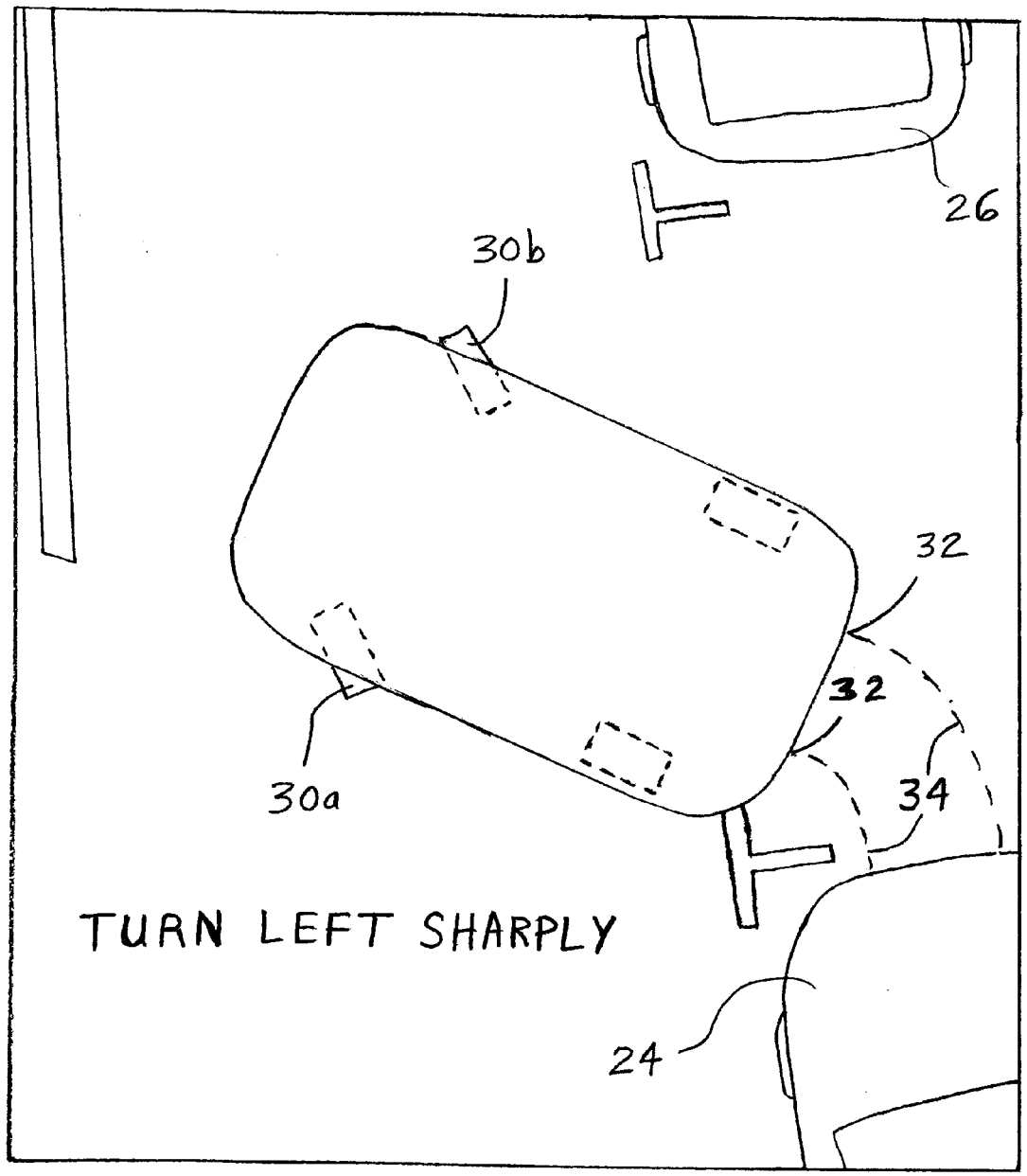
FIG. 10 is the example mapping of FIG. 8 at a point where the driver's vehicle must turn the steering wheel to the left in order to follow an optimal parking path.

FIG. 10 illustrates an example screen display when the vehicle reaches point 32. Text instructions to "TURN LEFT SHARPLY" may be provided on the screen display as shown when the vehicle reaches point 32. In addition, or alternatively, speaker 20 may emit audible spoken instructions to "turn left sharply."

An audible or visual warning may be given to the driver when a pedestrian enters the parking zone. The presence of the pedestrian may be detected by one of cameras 12, 14, or by an in-vehicle sonar system (not shown).

Figure 11:
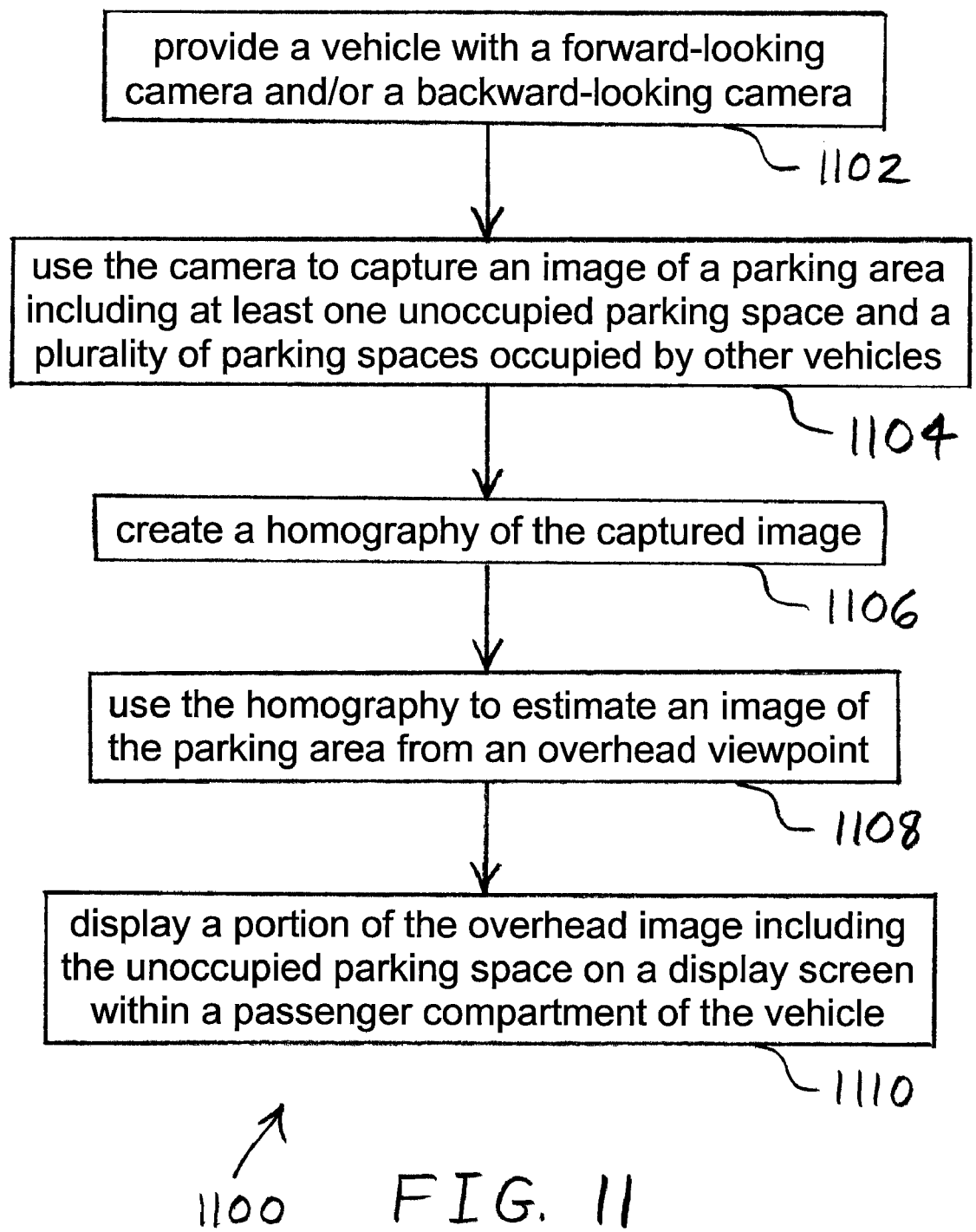
FIG. 11 is a flow chart illustrating one method of the present invention for assisting in parallel parking.

An embodiment of a method 1100 of the present invention for assisting in parallel parking is illustrated in FIG. 11. In a first step 1102, a vehicle is provided with a forward-looking camera and/or a backward-looking camera. For example, the vehicle shown in FIG. 1 includes a forward-looking camera 12 and a backward-looking camera 14.

In a next step 1104, the camera is used to capture an image of a parking area including at least one unoccupied parking space and a plurality of parking spaces occupied by other vehicles. For example, the image of FIG. 2, which is captured by a camera, is of a parking area including an unoccupied parking space 21 and other parking spaces occupied by other vehicles, such as vehicles 24 and 26.

Next, in step 1106, a homography of the captured image is created. That is, a projective transformation may be computed between the image plane of FIG. 2 and the ground plane. In this context, the ground plane may be thought of as the plane of the ground surface on which the parked cars are supported.

In step 1108, the homography is used to estimate an image of the parking area from an overhead viewpoint. For example, the homography may be used to transform the captured parking area image of FIG. 2 onto the ground plane to thereby estimate the overhead view of FIG. 3.

In a final step 1110, a portion of the overhead image including the unoccupied parking space is displayed on a display screen within a passenger compartment of the vehicle. That is, the overhead view of FIG. 3 may be further processed to recognize unoccupied parking space 21 and produce any of the images shown in FIGS. 4-10. Each of FIGS. 4-10 includes unoccupied parking space 21, and any of FIGS. 4-10 may be displayed on display screen 18.

Figure 12:
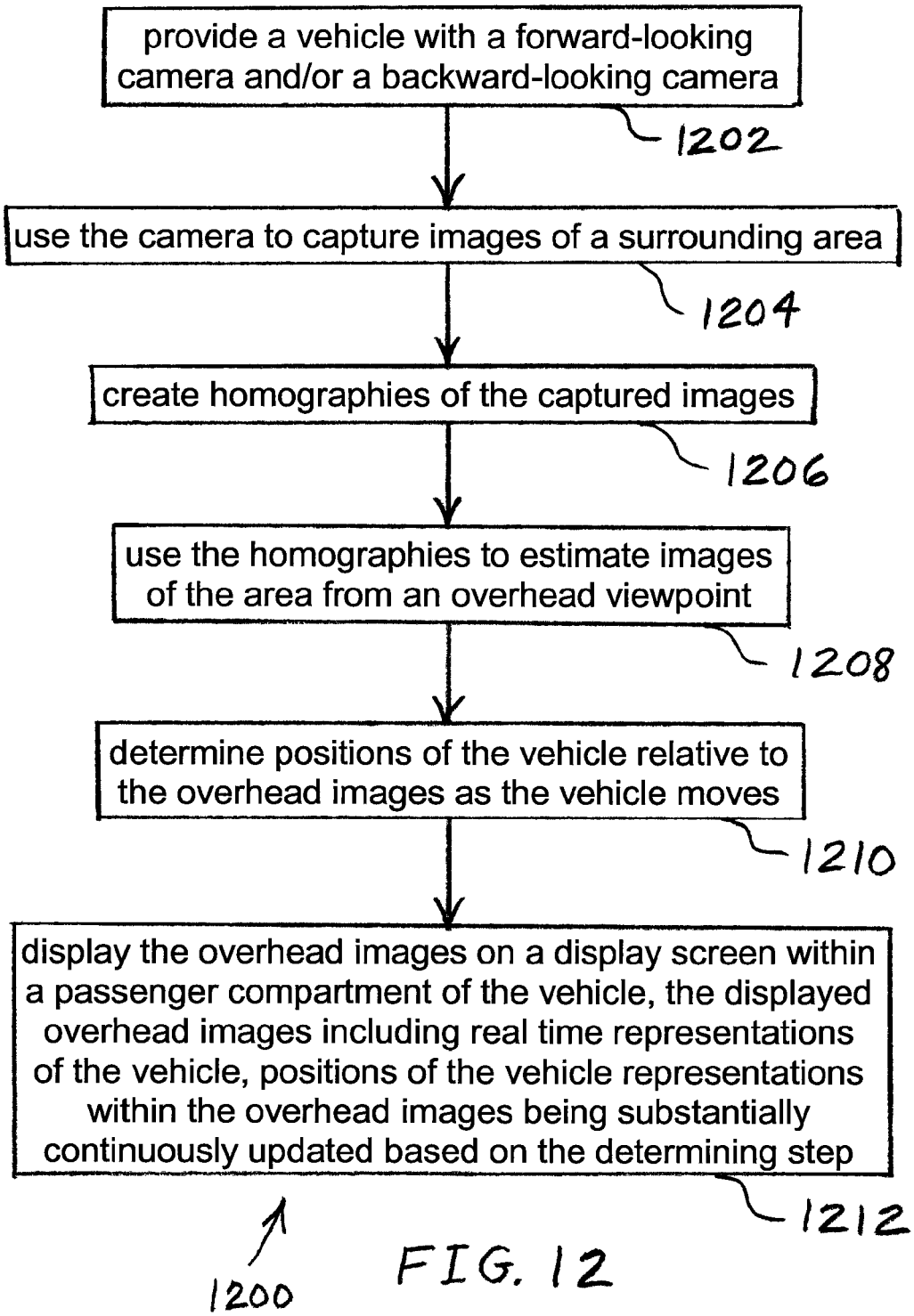
FIG. 12 is a flow chart illustrating one method of the present invention for displaying map information.

Another embodiment of a method 1200 of the present invention for displaying map information is illustrated in FIG. 12. In a first step 1202, a vehicle is provided with a forward-looking camera and/or a backward-looking camera. For example, the vehicle shown in FIG. 1 includes a forward-looking camera 12 and a backward-looking camera 14.

In a next step 1204, the camera is used to capture images of a surrounding area. For example, the image of FIG. 2, which is captured by a camera, is of a parking area surrounding the driver's vehicle.

Next, in step 1206, a homography of the captured image is created. That is, a projective transformation may be computed between the image plane of FIG. 2 and the ground plane. In this context, the ground plane may be thought of as the plane of the ground surface on which the parked cars are supported.

In step 1208, the homography is used to estimate an image of the parking area from an overhead viewpoint. For example, the homography may be used to transform the captured parking area image of FIG. 2 onto the ground plane to thereby estimate the overhead view of FIG. 3.

In a next step 1210, positions of the vehicle are determined relative to the overhead images as the vehicle moves. The position of the vehicle relative to the overhead images may be determined in any of various ways, including: calculating the current vehicle position based on the images currently captured by the camera(s); using distance sensors such as sonar or LIDAR on the driver's vehicle which sense the positions of the parked cars; and/or tracking the distance and direction traveled by the driver's vehicle based on odometer and steering sensor outputs since the area currently in the overhead view was last in the field of view of the camera (assuming an initial distance between the driver's vehicle and the unoccupied parking space is calculated based on sonar and/or the initially captured image of the unoccupied parking space).

In a final step 1212, the overhead images are displayed on a display screen within a passenger compartment of the vehicle, the displayed overhead images including real time representations of the vehicle, positions of the vehicle representations within the overhead images being substantially continuously updated based on the determining step. That is, the overhead images such as those shown in FIGS. 6 and 8-10 are displayed on display screen 18 within the a passenger compartment of the vehicle. In one embodiment, display screen 18 is mounted on the dashboard. Each of the displayed overhead images of FIGS. 6 and 8-10 may include real time representations of the driver's vehicle. Positions of the vehicle representations within the overhead images of FIGS. 6 and 8-10 may be continuously updated based on the latest actual positions of the driver's vehicle as determined using the latest input data.

The present invention has been described herein as being applied to assisting a driver in executing a parking maneuver. However, it is to be understood that the present invention may be applied to other applications, such as warning the driver of the exact locations of nearby pedestrians, or automatically preventing the driver from driving into a pedestrian.

While this invention has been described as having an exemplary design, the present invention may be further modified within the spirit and scope of this disclosure. This application is therefore intended to cover any variations, uses, or adaptations of the invention using its general principles.

What is claimed is:

1. A method for assisting in vehicle parking, comprising the steps of:
   providing a vehicle with at least one of a forward-looking camera and a backward-looking camera;
   using the camera to capture an image of a parking area including at least one unoccupied parking space and a plurality of parking spaces occupied by other vehicles;
   creating a homography of the captured image;
   using the homography to estimate an image of the parking area from an overhead viewpoint;
   displaying a portion of the overhead image including the unoccupied parking space on a display screen within a passenger compartment of the vehicle;
   measuring a size of the unoccupied parking space, the measuring being performed on the captured image and/or the overhead image; and
   providing an indication to a user of a success rate of previous parallel parking attempts in unoccupied parking spaces having sizes substantially equal to the measured size.

2. The method of claim 1 comprising the further step of automatically detecting the unoccupied parking space in the overhead image.

3. The method of claim 1 comprising the further step of providing a representation of a current location of the vehicle in the overhead image.

4. The method of claim 3 wherein the representation of the current location of the vehicle in the overhead image is continuously updated.

5. The method of claim 1 comprising the further steps of:
   calculating an optimal path for the vehicle to take to drive into the unoccupied parking space; and
   displaying the optimal path on the display screen.

6. The method of claim 1 comprising the further steps of:
   comparing the measured size of the unoccupied parking space to a size of the vehicle; and
   providing to a user an indication of whether the unoccupied parking space is large enough to accommodate the vehicle, the providing of the indication being dependent upon the comparing step.

7. The method of claim 6 comprising the further step of receiving from the user a minimum distance by which the measured size of the unoccupied parking space should exceed the vehicle size in order for the indication to be provided that the unoccupied parking space is large enough to accommodate the vehicle, the providing of the indication being dependent upon the received minimum distance.

8. The method of claim 1 wherein the at least one of a forward-looking camera and a backward-looking camera comprises a forward-looking camera used for at least one of night vision, lane detection and road sign detection.

9. The method of claim 1 wherein the at least one of a forward-looking camera and a backward-looking camera comprises a backward-looking camera used for backover avoidance.

10. An electronic parking-assistance arrangement for a vehicle, said arrangement comprising:
    at least one of a forward-looking camera and a backward-looking camera provided in the vehicle;
    a processor coupled to the at least one camera, the processor being configured to:
      receive first images of a parking area, the images being captured by the camera from a substantially horizontal viewpoint;
      translate the first images into second images from a substantially vertical viewpoint;
      identify an unoccupied parking space within the second images;
      superimpose a representation of the vehicle onto the second images when the vehicle is substantially adjacent to the unoccupied parking space, a position of the vehicle representation relative to the unoccupied parking space in the second images being continuously updated to indicate an actual position of the vehicle relative to the unoccupied parking space;

measure a size of the unoccupied parking space, the measuring being performed on the first images and/or the second images; and provide an indication to a user of a success rate of previous parallel parking attempts in unoccupied parking spaces having sizes substantially equal to the measured size; and a display screen provided in a passenger compartment of the vehicle and coupled to the processor, the display screen being configured to receive and display the second images with the superimposed representations of the vehicle.

11. The arrangement of claim 10 wherein the processor is configured to:

create a homography of the first images; and
use the homography in translating the first images into the second images.

12. The arrangement of claim 10 wherein the at least one of a forward-looking camera and a backward-looking camera comprises a forward-looking camera, the processor being configured to use the forward-looking camera for at least one of night vision, lane detection and road sign detection.

13. The arrangement of claim 10 wherein the at least one of a forward-looking camera and a backward-looking camera comprises a backward-looking camera, the processor being configured to use the backward-looking camera for backover avoidance.

14. The arrangement of claim 10 further comprising an audio speaker, the processor being configured to transmit audio signals to the audio speaker, the audio signals including spoken instructions for parallel parking.

15. The arrangement of claim 10 further comprising a steering sensor coupled to the processor, the steering sensor being configured to:

sense a direction in which a tire of the vehicle is steered; and
transmit to the processor a direction signal indicative of the direction;

the processor being configured to:
calculate an expected path of the vehicle based on the direction signal; and
provide an indication in the second images of the calculated expected path of the vehicle.

16. The arrangement of claim 15, wherein the processor is configured to:

calculate an optimal path branching off from the expected path; and
provide an indication in the second images of the optimal path.

17. A method of displaying map information, comprising the steps of:

providing a vehicle with at least one of a forward-looking camera and a backward-looking camera;
using the camera to capture images of a parking area including at least one unoccupied parking space and a plurality of parking spaces occupied by other vehicles;
creating homographies of the captured images;
using the homographies to estimate images of the parking area from an overhead viewpoint;
determining positions of the vehicle relative to the overhead images as the vehicle moves;
displaying the overhead images on a display screen within a passenger compartment of the vehicle, the displayed overhead images including real time representations of the vehicle, positions of the vehicle representations within the overhead images being substantially continuously updated based on the determining step;
measuring a size of the unoccupied parking space, the measuring being performed on the captured images and/or the overhead images; and
providing an indication to a user of a success rate of previous parallel parking attempts in unoccupied parking spaces having sizes substantially equal to the measured size.

18. The method of claim 17 comprising the further step of dividing the homographies into substantially identical grids of cells, the displaying step being dependent upon one of a mean, mode and variance of pixel values in corresponding cells.

19. The method of claim 17 wherein the at least one of a forward-looking camera and a backward-looking camera comprises a forward-looking camera used for at least one of night vision, lane detection and road sign detection.

20. The method of claim 17 comprising the further steps of:
calculating an optimal path for the vehicle to take to drive into the unoccupied parking space; and
displaying the optimal path on the display screen.

21. The method of claim 17 wherein the at least one of a forward-looking camera and a backward-looking camera comprises a backward-looking camera used for backover avoidance.

* * * * *